UNITED STATES PATENT OFFICE.

THOMAS FREDERICK HENLEY, OF PIMLICO, ENGLAND.

IMPROVEMENT IN PRESERVING MEATS, FISH, &c., AND MAKING MEAT EXTRACTS.

Specification forming part of Letters Patent No. 131,820, dated October 1, 1872.

*To all whom it may concern:*

Be it known that I, THOMAS FREDERICK HENLEY, of Pimlico, in the county of Middlesex, England, gentleman, have invented a new and useful Improvement in the Treatment of Meat and Fish for the Preservation of the same for Food; and I do hereby declare that the following is a full, clear, and exact description of the same.

This invention has for its object the rapid and economical removal of the fluid portions of meat and fish, whereby a more or less complete desiccation, with the consequent preservative result on such substances, is obtained. I have found by experiment that when meat and fish are deprived to a certain extent of their watery constituents by means of pressure their tendency to rapid decay on exposure to the air is removed; and I have also found that the juices extracted by pressure may be utilized and converted into an article of food by the application thereto of an edible antiseptic. My invention, therefore, consists of two parts— namely, first, treating meat and fish so that in the solid state they may be preserved from decay; and, secondly, utilizing the juices extracted therefrom and converting them into a solid condiment.

In practice, the pressure required for operating upon the meat may be obtained by the employment of the hydraulic, screw, lever, or roller press, or any of the various machines usually employed for obtaining powerful mechanical pressure. The matters to be pressed may be operated on in their natural or raw state; or they may be heated during or as a part of the pressing operation; or, again, the pressure may be applied only after the substances have been subjected to a preliminary heating. According to one mode of operating under what may be termed the cold-pressure process, I reduce the substance proposed to be desiccated (say raw beef or mutton) into small pieces and place the same on press-cloths in a stratum of from half an inch to one inch in thickness; but I do not limit myself to these proportions. The said press-cloths having been previously placed on a light frame or former, the object of which is to regulate the size and thickness of the pressed cake, the press-cloth is to be folded over, the frame removed, and the said cake or cakes placed in the press, each cake alternating with an iron plate until the press is charged. The pumps are now put in motion (where a hydraulic-press is the agent) and the pressure gradually applied. I find it desirable for the efficient performance of the operation to apply the pressure gradually and to increase it until a pressure of about one hundred and forty-four pounds on the square inch is obtained. The time employed in squeezing out the juices of the meat should be about fifteen minutes, and the amount of liquid discharged should be about twenty-five per cent. or one-fourth of the gross weight of the meat under treatment. The fluid portions or juices of the meat, as they run off from the press, are to be conducted into a vessel, where they are mixed with an edible antiseptic, as will be hereafter explained. The meat having been submitted to a suitable amount of pressure to convert it into cakes or slabs is now to be removed from the press and rubbed with dry salt, then cut up and packed in suitable packages, according to its destination.

When employing heat and pressure combined I cause the substances proposed to be operated on to be placed in the raw state on the press-cloths and frames in the same manner as in the cold process above described, but in lieu of the ordinary press-plates I make use, as in the hot-pressing of woolen cloths, of hot plates, heated to a temperature which may be from 250° to 300° Fahrenheit, by which means the albuminoid elements are fixed within the meat, which is, in fact, cooked and desiccated at the same time. Suitable condiments are to be added to the meat before placing it in the press, and the pressure having been applied and sustained as described, with reference to the cold-pressure process, an excellent savory meat biscuit, well adapted for troops on the march and for naval stores is produced. This process being both rapid and economical is applicable in many countries where meat is abundant and cheap, and where the climate necessitates the immediate employment of preserving agencies.

The liquid discharged from the meat in this hot-pressing process I propose to use with other materials, to be presently more particularly referred to in the production of the edible antiseptic, which is to be employed in preserving the juices obtained from the cold-pressure process.

As a modification of the above I propose, also, in some instances, to subject the substances to be preserved to the action of steam in suitable chambers previously to submitting them to the press.

In situations where fish is abundant and cheap, the pressure process may be employed with advantage, and larger quantities may be saved in the same time than by the ordinary methods of drying, smoking, &c. In the treatment of fish I prefer to steam it or to plunge it into boiling water after the removal of the bones and offal, and then to submit it to cold pressure in the manner above described. In order to convert the juices extracted by the cold-pressure process from the raw meat or fish, I avail myself of the proved antiseptic properties of meat extract, concentrated beef-tea, or meat essences, and dry gelatine. Thus the meat juice, which has been obtained by pressure from raw meat by the first described or cold process, may be combined with meat extract in equal or other proportions, and the product resulting from that mixture will be fit for use in making soups and gravies. The meat extract I propose to prepare by boiling down the bones and the trimmings obtained from the meat during its preparation for the press. This boiling I continue until I obtain the result well known to cooks by the term "stock," which becomes solid when cool. The degree of concentration which I prefer to give to this stock or meat extract will be such as to insure for it, when cold, a solidity equal to that obtained by combining dry gelatine and water in equal parts. Before using the meat essence thus prepared I heat it in a suitable vessel and pass it through a cooling-worm, and thereby reduce its temperature to about 120 degrees during its passage to the mixing-vessel. Into this vessel I run the juices from the raw meat, and by the use of a stirrer insure a thorough mixture of the same. When the compound is thus prepared it can be run off into molds to form cakes, or it may be received into tins or jars or animal membranes, when it will be fit for the market. The juice obtained from the hot-meat press, as it possesses no albuminous properties, (the same having been retained in the meat by the chemical action of the heat,) has an antiseptic character, and it is therefore to be mixed with the stock or meat extract employed in treating the raw juices. When using concentrated beef-tea as the preservative material, it may contain, say, about fifty per cent. of water. When gelatine is used for the like purpose I combine, say, two parts of dry gelatine with three parts by weight of the raw juices, and having reduced the gelatine by the application of heat to a liquid state, I mix therewith the raw-meat juices and obtain the compound desired, which may be packed in jars, tins, or animal membrane, or cast in cakes for the market.

I am aware that comminuted meat, &c., has been subjected to a temperature not exceeding 140° Fahrenheit previous to being subjected to pressure for the extraction of the juices in preserving food and preparing extracts; but this I do not claim.

Having now explained the nature of my invention, I wish it to be understood that I claim—

1. The herein-described process of preserving animal food from decay by application of cold pressure, as specified.

2. Applying the antiseptic properties of extract of meat, concentrated meat essence, of concentrated beef tea, and of dry gelatine to the preservation of the juices discharged from raw meat, in the manner and for the purpose above described.

3. Utilizing the juices discharged from meat by hot pressure, in the manner and for the purpose above described.

In witness whereof I have hereunto set my hand and seal the fifth day of January, 1872.

T. F. HENLEY. [L. S.]

Witnesses:
H. K. WHITE,
  66 *Chancery Lane.*
J. B. WYNN,
  24 *Royal Exchange, London.*